Patented July 21, 1931

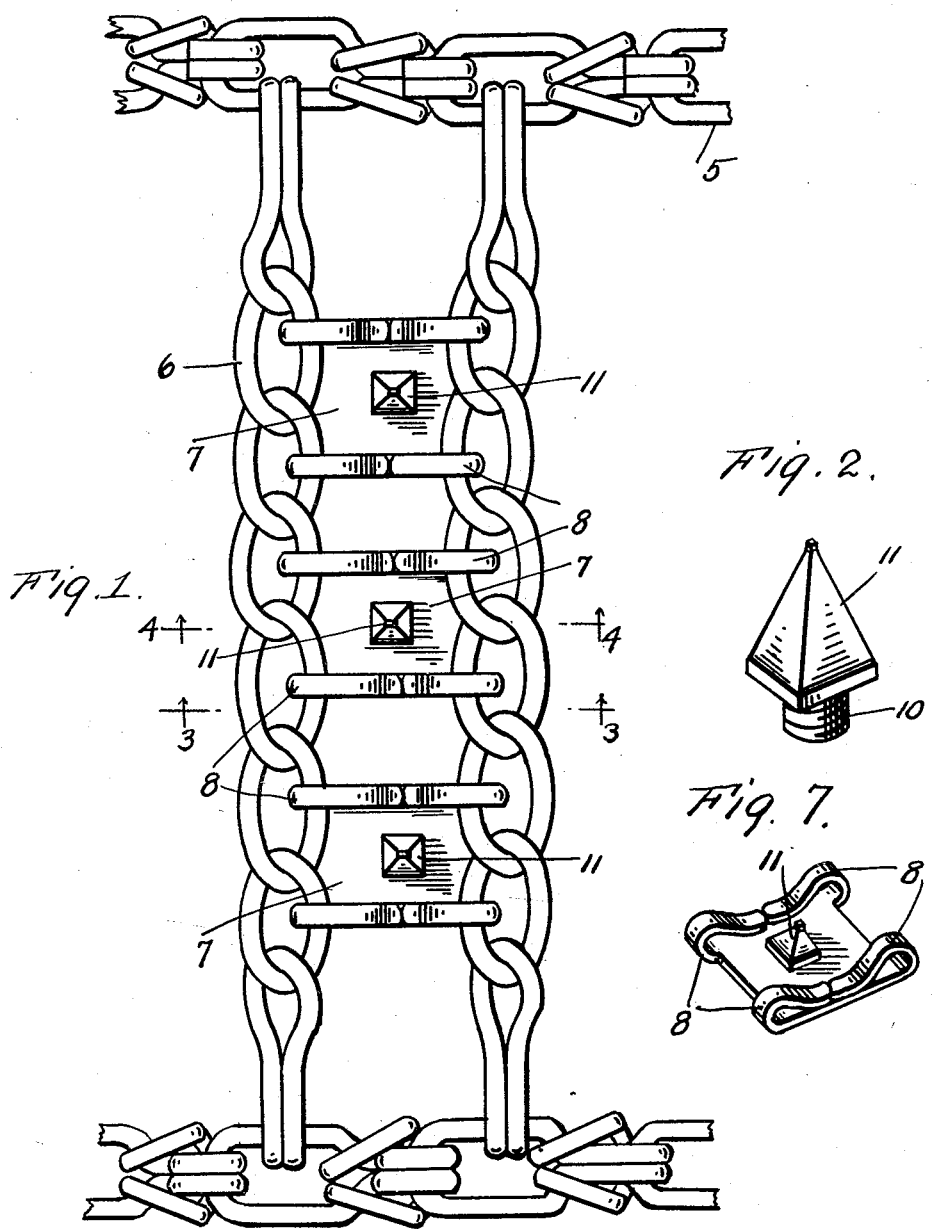

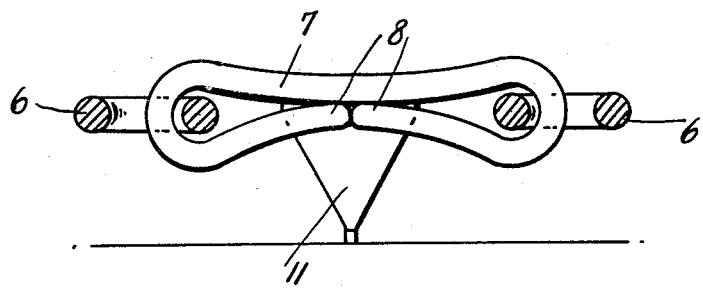
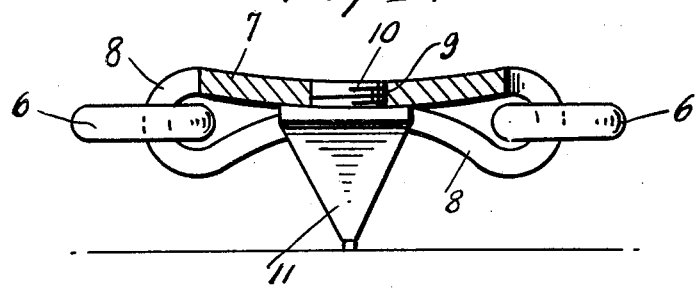
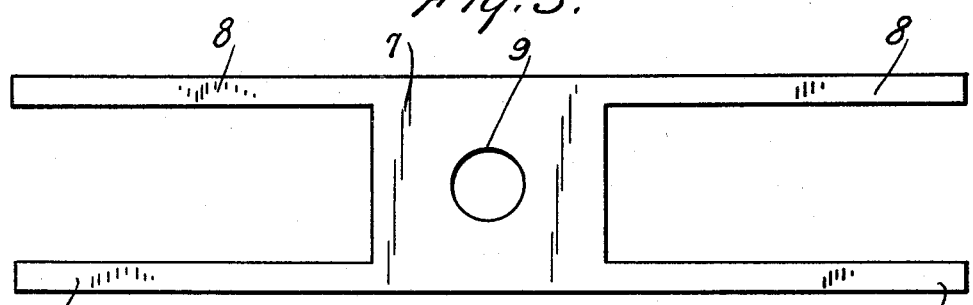
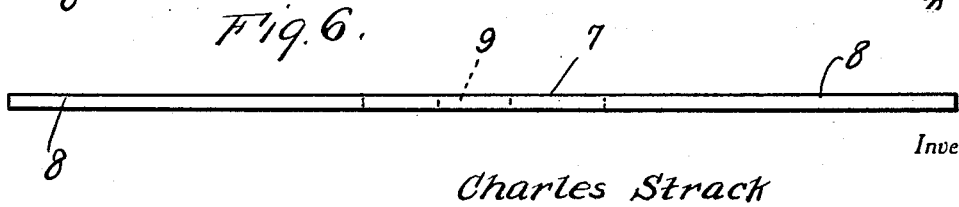

1,815,278

UNITED STATES PATENT OFFICE

CHARLES STRACK AND ELTON C. STRACK, OF RANDOM LAKE, WISCONSIN

TIRE CHAIN

Application filed March 17, 1930. Serial No. 436,594.

The present invention relates generally to tire chains and more particularly to improved cross members therefor and the prime object of the invention resides in the provision of a tire chain which will be effective in preventing the car from slipping on ice and also prevent the car from skidding when going around corners or when the brakes are applied.

Another very important object of the invention resides in the provision of a tire chain structure of this nature which is simple, inexpensive to manufacture, strong and durable, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawings.

Figure 1 is a fragmentary plan view of the chain embodying the features of my invention, Figure 2 is a perspective view of one of the calks, Figure 3 is a detail section taken substantially on the line 3—3 of Figure 1, Figure 4 is a detail section taken substantially on the line 4—4 of Figure 1, Figure 5 is a view of the blank from which one of the plates is formed, Figure 6 is an edge view thereof, and Figure 7 is a perspective view of one of the plates.

Referring to the drawings in detail it will be seen that the numerals 5 denote longitudinal chains connected by cross chains 6 which are arranged in pairs. In Figure 1 I have shown a single pair for the purpose of exemplifying my invention. Numerals 7 denote a plurality of plates on the ends of which are formed clips 8. These clips 8 are bent over upon the plate and are engageable through links of the chains 6 as is clearly illustrated in Figures 3 and 4.

Each plate may be formed from blank such as is shown in Figures 5 and 6. In the center of each plate is an opening 9 for threadedly receiving shank 10 of a pyramid shaped calk 11. Thus these calks 11 may be renewed when they wear down. It will be seen that the plates may be easily and quickly assembled in respect to the cross chains 6.

This chain structure gives a very extensive non-skid and non-slipping engagement with the roadway and is particularly effective in ice, snow and the like.

It is thought that the construction, utility and advantages of this invention will now be quite apparent to those skilled in this art without a more detailed description thereof.

The present embodiments of the invention have been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A tire chain comprising a pair of spaced side circumferentially extending holding chains and pairs of transversely extending tread chains connected with the side chains, the tread chains of each pair being arranged in relatively close relation, and a plurality of equidistantly spaced circumferentially extending tread plates connecting the tread chains of each pair together.

2. In a tire chain, a tread plate including a body portion and a plurality of resilient clip fingers formed on the ends of the body portion at the corners thereof, said fingers overlying the outer face plate and terminating in abutting relation to each other.

In testimony whereof we affix our signatures.

CHARLES STRACK.
ELTON C. STRACK.